July 16, 1929.                J. JENSEN                1,721,182
                           ANGLE IRON SHEAR
                        Filed April 20, 1927
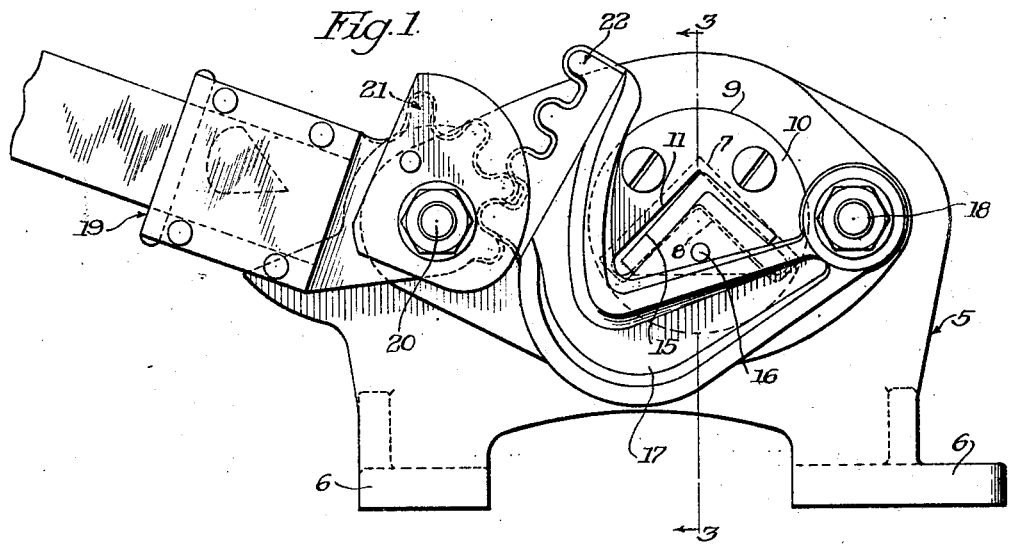
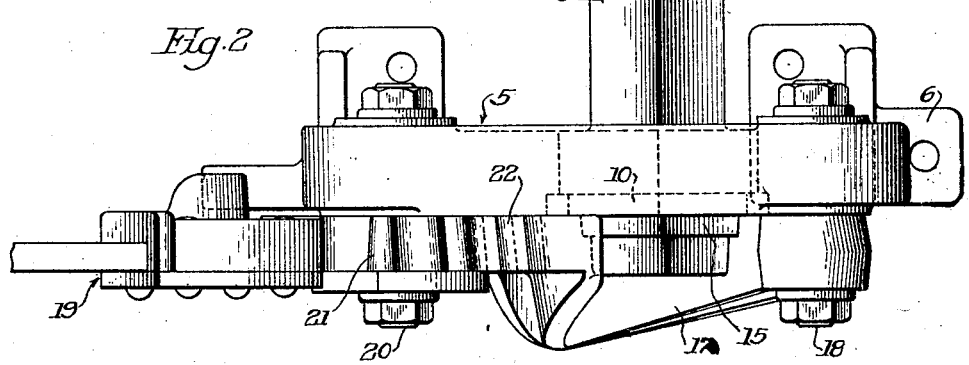
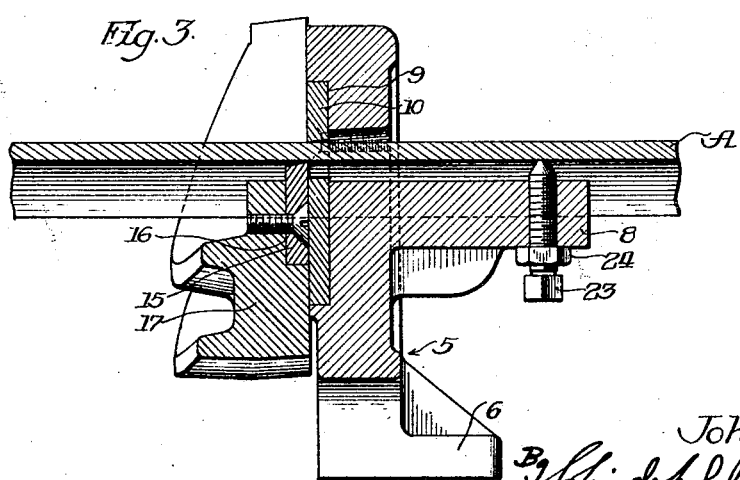
Inventor:
John Jensen
By
        Attys Patented July 16, 1929.

1,721,182

UNITED STATES PATENT OFFICE.

JOHN JENSEN, OF ROCKFORD, ILLINOIS, ASSIGNOR TO WHITNEY METAL TOOL COMPANY, OF ROCKFORD, ILLINOIS, A CORPORATION OF ILLINOIS.

ANGLE-IRON SHEAR.

Application filed April 20, 1927. Serial No. 185,149.

The invention relates generally to the type of shears which have one blade mounted on a stationary frame and the other mounted on a swinging arm which is pivoted on the frame. It is herein illustrated and described with particular reference to such shears which are adapted to shear bars of iron or steel having a particular shape, such as angle iron bars.

It is customary in small shops or in field work, to operate such shears manually, and it is desirable therefore that the shear be so constructed that the shearing operation may be accomplished with a minimum of effort.

It has also been found desirable in shears of this type, that the shearing blades remain in close lateral contact during the shearing operation so that the blades will have a true shearing action. It has also been found desirable to have some means to support the work so as to produce a sheared surface which is at right angles to the longitudinal axis of the angle iron bar.

This invention has for its aim the provision of a means of an advantageous construction for shearing angle iron bars; and the primary object of the invention is to provide a machine of this character whereby the shearing operation may be accomplished effectually and with a minimum expenditure of effort.

A more specific object is to provide a construction and arrangement whereby the two adjoining legs or walls of the angle are cut successively in a single stroke of the operating lever.

Another object is to coordinate the operating means with the shearing means so that a maximum amount of leverage may be obtained in both portions of the shearing operation, that is to say, in the shearing of successive legs of the angle.

Another object is to provide novel means whereby the two shearing blades are constantly urged together laterally during the shearing operation and will thus operate to exert all of the force applied in a true shearing plane.

Other and ancillary objects and advantages will become apparent from the following description and in the accompanying drawings, in which:

Figure 1 is a fragmentary elevational view of an angle iron shear embodying the features of the invention.

Fig. 2 is a fragmentary plan view of the shear shown in Fig. 1.

Fig. 3 is a sectional view taken along line 3—3 of Fig. 1 showing the shear and the work support cooperating to hold an angle bar in position during the shearing operation.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more specifically to the drawings, the improved shear comprises an upright frame 5 in the form of a relatively heavy casting with flanges 6 at its lower edge whereby it may be attached to a suitable support. Substantially centrally of the frame an opening is provided in the form of an angular slot 7 arranged to simulate an inverted V. A work rest or support is provided in the form of an angular arm 8 preferably cast integral with and extending rearwardly from the frame 5 at a point below the slot 7. Thus an angle iron bar may be passed through the slot 7 and supported rearwardly of the frame by the arm 8.

In the forward face of the frame 5 a circular recess 9 is provided in which is seated a stationary shear blade 10 having a slot 11 therein registering with the slot 7 in the frame. The upper inclined edges of this slot are sharpened and relieved rearwardly so as to form shearing edges.

The movable shear element comprises a substantially triangular blade 15 secured in a recess 16 in the rear face of a swinging arm 17. This arm 17 is pivoted in the present instance to the frame 5 adjacent the right hand end of the slot 7, and is curved downwardly and then upwardly at the opposite side of said slot 7 for connection with the operating means. Herein the arm is pivoted upon a bolt 18 passing through the frame. It should be noted that the blade 15 is placed at such a position on the arm 17 that it will, during a shearing operation, engage and shear, first one leg of an angle A and then the other leg.

The operating means for the arm 17, as herein shown, comprises a hand lever 19 pivotally secured by means of a bolt 20 to the frame near the left end thereof. The lever 19 has rigid therewith a gear segment 21 meshing with a rack 22 on the free end of the arm 17. It will be seen that at the beginning of the shearing operation the maximum leverage is obtained for the lever arm 17 operating on its fulcrum 18, and that as the shearing operation progresses the distance between the fulcrum of this arm and the point of engagement of the shear with the work, increases. On the other hand it will be observed that as the shearing operation progresses, the distance between the fulcrum of the operating lever 19 and the point of engagement with the arm 17, decreases. Thus during the first portion or stage of the shearing operation, in which the wall or leg of the angle adjacent the pivotal point of the arm 17 is being cut, said arm exerts its maximum leverage; and as the second stage of the operation is reached in which the leg or wall of the angle nearest the fulcrum point of the operating lever is cut, the maximum leverage in the operating lever is obtained. It will be seen, therefore, that the shearing operation as thus accomplished in successive stages and compensating leverages renders it possible to perform the operation with a minimum expenditure of effort on the part of the operator.

In order that an angle iron bar of any thickness may be supported so as to secure a cut at right angles to its longitudinal axis, adjustable supporting means is provided mounted in the rearwardly extending arm 8. This means is herein shown as comprising a vertically adjustable screw 23 mounted in a threaded bore near the rear end of the bar 8 and having a lock nut 24 thereon. The upper end of the screw 23 is pointed so as to support the axis of the bar in the proper vertical plane.

To keep the two shearing blades 10 and 15 in close lateral relation during the shearing operation means is provided associated with the free end of the movable shear arm 17. This means herein constitutes oppositely tapered gear teeth in the gear segment 21 and the rack 22. The teeth of the gear segment 21 are tapered laterally toward the main frame while the gear teeth of the rack 22 are tapered laterally away from the main frame.

Thus, the teeth of the gear segment and the rack will present opposed cam surfaces to each other. Since the gear segment 21 is fixed by the bolt 20 against lateral movement, the opposed cam surfaces of the gear teeth will operate to apply a part of their force laterally to the free end of the shear arm 17, this force being in the direction of the stationary shearing blade 10.

It will be apparent that resultant of the forces which are thus applied to the free end of the pivoted arm will be a force applied angularly upwardly and toward the main frame in such a manner as to tend not only to move the blade through the shearing operation but also to force the movable blade into close lateral contact with the stationary blade.

It will be apparent that a construction is provided in which the shearing operation may be accomplished with the minimum of effort due to the fact that the constant changing of the point of shearing is compensated for by the eccentric gear on the operating handle.

It will also be apparent that a shear of this construction may be adjusted so as to satisfactorily cut angle iron bars of different thicknesses so that the ends thereof will be sheared at right angles to their longitudinal axes.

It will also be apparent that in a shear embodying the features herein described the blades will be forced into close lateral contact during the shearing operation. When the blades are held in close contact, it has been found that they retain their sharpness for a greater length of time, and produce a better sheared surface.

This application forms a continuation in part of applicant's co-pending application Serial No. 708,828, filed April 24, 1924.

I claim as my invention:

1. An angle iron shear comprising, in combination, a support having an opening therein, a stationary shear blade secured to the support and having an angular slot therein adapted to receive the angle iron to be cut and providing two cutting edges, an arm pivoted to the support adjacent one end of the slot, an operating lever pivoted to the support on the side of the slot opposite the pivot for said arm, an angular blade carried by said arm and adapted in the swinging movements of the arm to engage first with one wall or leg of the angle iron and then with the other, and gear elements rigid with the arm and lever respectively whereby the lever exerts a gradually increasing leverage upon the arm as the point of engagement of the movable shear blade with the work moves away from the fulcrum point of the arm.

2. An angle iron shear comprising, in combination, an upright frame having a opening therethrough, a blade secured to one side of the frame and having an angular slot therein adapted to receive an angle bar, an arm pivoted to the frame at one side of the slot and extending around the slot to the opposite side of the frame, an operating lever associated with the other end of said arm to swing it, and a shear blade carried by said arm and adapted in the swinging movements of the latter to engage successively the adjoining legs or walls of the angle bar to sever them.

3. An angle iron shear, comprising, in combination with a support, a stationary shear blade having an angular slot therein adapted to receive an angle iron bar, an arm pivoted at one side of said slot and extending to the opposite side thereof, a lever having a gearing connection with said arm, and a shear blade on the arm adapted to coact with the stationary blade to perform the shearing operation, the arrangement being such that the adjoining legs or walls of the angle iron are cut successively, and said gearing connection being constructed to effect a gradually increasing leverage upon the arm as the wall or leg of the angle iron farthest remote from the pivotal point of the arm is cut.

4. A shearing machine having, in combination, a stationary shear element, a movable shear element, means including a pivoted arm for moving the movable element into engagement with a piece of work whereby to create a single travelling point of engagement of the movable element with the work which point progresses away from the pivotal point of the arm as the shearing progresses, and means for operating the arm comprising a lever operable to gradually increase the effectiveness of the leverage on the arm as the shearing point progresses.

5. A shearing machine having, in combination, a base, a stationary shear element mounted on said base, an arm having one end pivoted on said base, a movable shear element mounted on said arm intermediate its ends, means operable to move the free end of said arm to bring said movable shear element into shearing relation with said stationary element, said means being operable to apply force laterally of said free end of said arm with an increasing leverage as the shearing operation progresses so as to force said movable shear blade into close lateral relation with said stationary shear blade.

6. A shearing machine having, in combination, a stationary shear element, a movable shear element, means including a pivoted arm for moving the movable element into shearing engagement with a piece of work whereby said movable element engages said work progressively from one edge to the other, and means operable to move said pivoted arm through the shearing operation by application of a gradually increasing force angularly toward said stationary shear element so as to hold said movable shear element in lateral contact with said stationary shear element.

7. An angle iron shear comprising, in combination, a base, a stationary shear blade mounted on said base, an arm having one end pivoted to said base, a shear blade mounted on said arm, an operating lever pivoted on said base and cooperating with the free end of said arm to swing said arm about its pivot with a gradually increasing force and thereby move the shearing blade mounted on said arm into shearing relation with said stationary shearing blade, and means operable whereby a portion of the force which is exerted on said lever is operative to force said shear blades into close lateral contact.

8. The combination with a shearing device having shearing blades adapted to be moved relative to each other, of means operable to move said blades to accomplish a shearing operation, said means including an eccentric gear segment having teeth which are tapered laterally so as to urge said blades laterally together during the shearing operation.

9. The combination with a shearing device having a stationary blade and a movable blade, of means operable to move said movable blade by application to the said blade of a gradually increasing force angularly toward the stationary blade so as to move the blade through a shearing operation and hold the two blades in lateral contact during said shearing operation.

In testimony whereof, I have hereunto affixed my signature.

JOHN JENSEN.